United States Patent [19]
Neufeld et al.

[11] Patent Number: 6,167,538
[45] Date of Patent: Dec. 26, 2000

[54] METHOD AND APPARATUS FOR MONITORING COMPONENTS OF A COMPUTER SYSTEM

[75] Inventors: E. David Neufeld, Tomball; Andrew C. Cartes, Spring; Mark R. Potter, Tomball, all of Tex.

[73] Assignee: Compaq Computer Corporation, Houston, Tex.

[21] Appl. No.: 09/036,263

[22] Filed: Mar. 6, 1998

[51] Int. Cl.⁷ .................................................. G06F 11/00
[52] U.S. Cl. ............................................................ 714/47
[58] Field of Search .................................. 714/47, 39, 30, 714/38, 714, 712, 736, 815; 364/551.01, 284.4, 265; 709/224, 226; 702/185, 186, 188; 717/3, 4, 5, 6

[56] References Cited

U.S. PATENT DOCUMENTS

| | | | |
|---|---|---|---|
| 5,459,837 | 10/1995 | Caccavale | 714/47 |
| 5,548,724 | 8/1996 | Akizawa et al. | 709/200 |
| 5,642,478 | 6/1997 | Chen et al. | 714/45 |
| 5,796,633 | 8/1998 | Burgess et al. | 364/551.01 |
| 5,880,954 | 3/1999 | Thompson et al. | 702/185 |
| 5,956,479 | 9/1999 | McInerney et al. | 714/38 |

OTHER PUBLICATIONS

ODI Developer's Guide for NetWare Server Driver Hardware Specific Modules—Driver specification Version 3.2., Document Version 2.0, Novell, Inc. Mar. 22, 1994.

*Primary Examiner*—Robert W. Beausoliel, Jr.
*Assistant Examiner*—Pierre Eddy Elisca
*Attorney, Agent, or Firm*—Akin, Gump, Strauss, Hauer & Feld, LLP

[57] ABSTRACT

Improved techniques for monitoring behavioral data of components of a computer system are disclosed. The monitoring begins to monitor a component once a monitoring program recognizes the presence of the component within the computer system. Then, the monitoring program tracks behavioral data generated by the component. A user interacting with the monitoring program is thus able to monitor the operation of the component by analyzing the various behavioral data it receives from the component. In one embodiment, the component is a hardware resource and its driver sends events to the monitoring program, and the driver receives commands from the monitoring program.

32 Claims, 8 Drawing Sheets

METHOD AND APPARATUS FOR MONITORING COMPONENTS OF A COMPUTER SYSTEM

CROSS-REFERENCE TO RELATED APPLICATION

This application is related to U.S. patent application Ser. No. 08/921,968, filed Sep. 2, 1997, and entitled METHOD AND APPARATUS FOR IDENTIFICATION OF FEATURES ASSOCIATED WITH COMPUTERS, and such application is hereby incorporated by reference for all purposes.

BACKGROUND OF THE INVENTION

1. Field of the Invention

The present invention relates to a computer system and, more particularly, to monitoring operation of resources a computer system.

2. Description of the Related Art

Performance monitoring of components (namely, hardware resources and software resources) of a computer system is an important tool for evaluating the workload or operation of the computer system. Such performance monitoring is useful for many tasks, including failure prediction, workload or utilization analysis, suitability of platform, and the like.

Generally, performance information for a computer system is provided only to device drivers and other low-level components. Conventionally, it is possible to monitor performance of a specific hardware resources and system software resources of a computer system using data or events generated by a driver for the specific hardware resource. However, the driver and a monitor program (e.g., an application program or operating system interested in the event or data) had to be tightly coupled, customized or dedicated to interacting with the driver for the specific hardware resource. As an example, a driver was able to save event data concerning the specific hardware resource, but the monitor program interested in the event data had to know where the driver would store the data so that the monitor program could utilize the data or have special hooks built into the driver in order to obtain the data. Further, given that the program monitor was tightly coupled, customized or dedicated to interacting with the driver for the specific hardware resource, it was difficult to compare like data from other drivers.

Another problem with conventional approaches to monitoring performance of specific hardware resources of a computer system is that the events were typically stored by a driver and then subsequently retrieved at a later time by a performance monitor. Hence, the conventional approaches usually provided only historical data. As a result, such conventional approaches were unable to provide real-time monitoring of the performance of hardware resources.

Thus, there is a need for improved techniques for monitoring hardware resources of a computer system.

SUMMARY OF THE INVENTION

Broadly speaking, the invention relates to improved techniques for monitoring behavioral data of components of a computer system. The behavioral data is produced by the components and includes, for example, events, rates, totals, averages or states. The components of the computer system include, for example, drivers, hardware resources, application programs or operating system programs.

The monitoring begins to monitor a component once a monitoring program recognizes the presence of a compatible component within the computer system. Then, the monitoring program tracks behavioral data generated by the component. The behavioral data being monitored can, for example, pertain to the performance, security or health of hardware and software resources of the computer system. A user interacting with the monitoring program is thus able to monitor the operation of the component by analyzing the various behavioral data it receives from the component. In one embodiment, the component is a hardware resource and its driver sends events to the monitoring program, and the driver receives commands from the monitoring program. In another embodiment, the component is a software resource, namely, an operating system program, and the events could, for example, include thread switches and mutex locks.

The invention can be implemented in numerous ways, including as a device, a system, a method, or as computer code on a computer readable medium. Several embodiments of the invention are discussed below.

As a computer system, an embodiment of the invention includes: a processing unit for executing programs; a plurality of hardware resources utilized by the processing unit; a plurality of interface mechanisms to the hardware resources; and a performance monitoring program that interacts with the hardware resources using the interface mechanisms so as to monitor performance of the hardware resources, the performance monitoring program being executed by the processing unit. The interface mechanisms are registered with the performance monitoring program so that the interface mechanisms know to send particular information on at least the hardware resources to the performance monitoring program.

Also as a computer system, another embodiment of the invention includes: a processing unit for executing programs; a plurality of hardware resources utilized by the processing unit; a plurality of interface mechanisms to the hardware resources; and a behavioral monitoring program that interacts with the hardware resources using the interface mechanisms so as to monitor behavior of the hardware resources, the behavioral monitoring program being executed by the processing unit. The interface mechanisms are registered with the behavioral monitoring program so that the interface mechanisms know to send particular information on at least the hardware resources to the behavioral monitoring program.

As a method for monitoring hardware resources of a computer system which has drivers for interacting with the hardware resources, an embodiment of the invention includes the operations of: registering drivers that are active with a performance monitoring program, the drivers having event information for the respective hardware resources; informing the registered drivers of event information that the performance monitoring program is interested in receiving from the registered drivers; selectively forwarding event information from the registered drivers to the performance monitoring program to the extent interested; and receiving the event information at the performance monitoring program; and maintaining, at the performance monitoring program, performance information on the hardware resources associated with the registered drivers in accordance with the event information received.

As a computer readable medium containing program instructions for monitoring components of a computer system that has interface mechanisms for interacting with the components, an embodiment of the invention includes: first computer readable code for registering interface mechanisms that are active with a performance monitoring program, the interface mechanisms having behavioral information for the respective components; second computer readable code for informing the registered interface mechanisms of behavioral information that the performance monitoring program is interested in receiving from the registered interface mechanisms; third computer readable code for selectively forwarding behavioral information from the registered interface mechanisms to the performance monitoring program to the extent interested; fourth computer readable code for receiving the behavioral information at the performance monitoring program; and fifth computer readable code for maintaining, at the performance monitoring program, performance information on the components associated with the registered interface mechanisms in accordance with the behavioral information received.

The advantages of the invention are numerous. One advantage of the invention is that the monitoring of components of a computer system is made flexible and reliable. The flexibility, for example, allows the components to be hardware or software resources. Another advantage of the invention is that the monitoring can be essentially real-time monitoring. Yet another advantage of the invention is that different monitoring programs are able to both monitor the same hardware resource. Still another advantage of the invention is that components can come and go or be enabled (in any order) not only during operation of the computer system but also while monitoring of the computer system is being performed, without causing system difficulties in either case.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved techniques for monitoring behavioral data of components of a computer system. The behavioral data is produced by the components and includes, for example, events, rates, totals, averages and states. The behavioral data being monitored can, for example, pertain to the performance, security or health of the components of the computer system. The components of the computer system include, for example, drivers, hardware resources, application programs and operating system programs. The monitoring provided by the invention is flexible and non-intrusive. The monitoring provided by the invention also facilitates essentially real-time monitoring of the components.

The monitoring begins to monitor a component once a monitoring program recognizes the presence of a compatible component within the computer system. Then, the monitoring program tracks behavioral data generated by components. The behavioral data can, for example, include any one or more of events, rates, totals, averages, or other statistics. The events can be either periodic events or immediate data events. A user interacting with the monitoring program is thus able to monitor the operation of the component by analyzing the various behavioral data it receives from the component. In one embodiment, the component is a hardware resource and its driver sends events to the monitoring program, and the driver also receives commands from the monitoring program. In another embodiment, the component is a software resource, namely, an operating system program, and the events could, for example, include thread switches and mutex locks.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
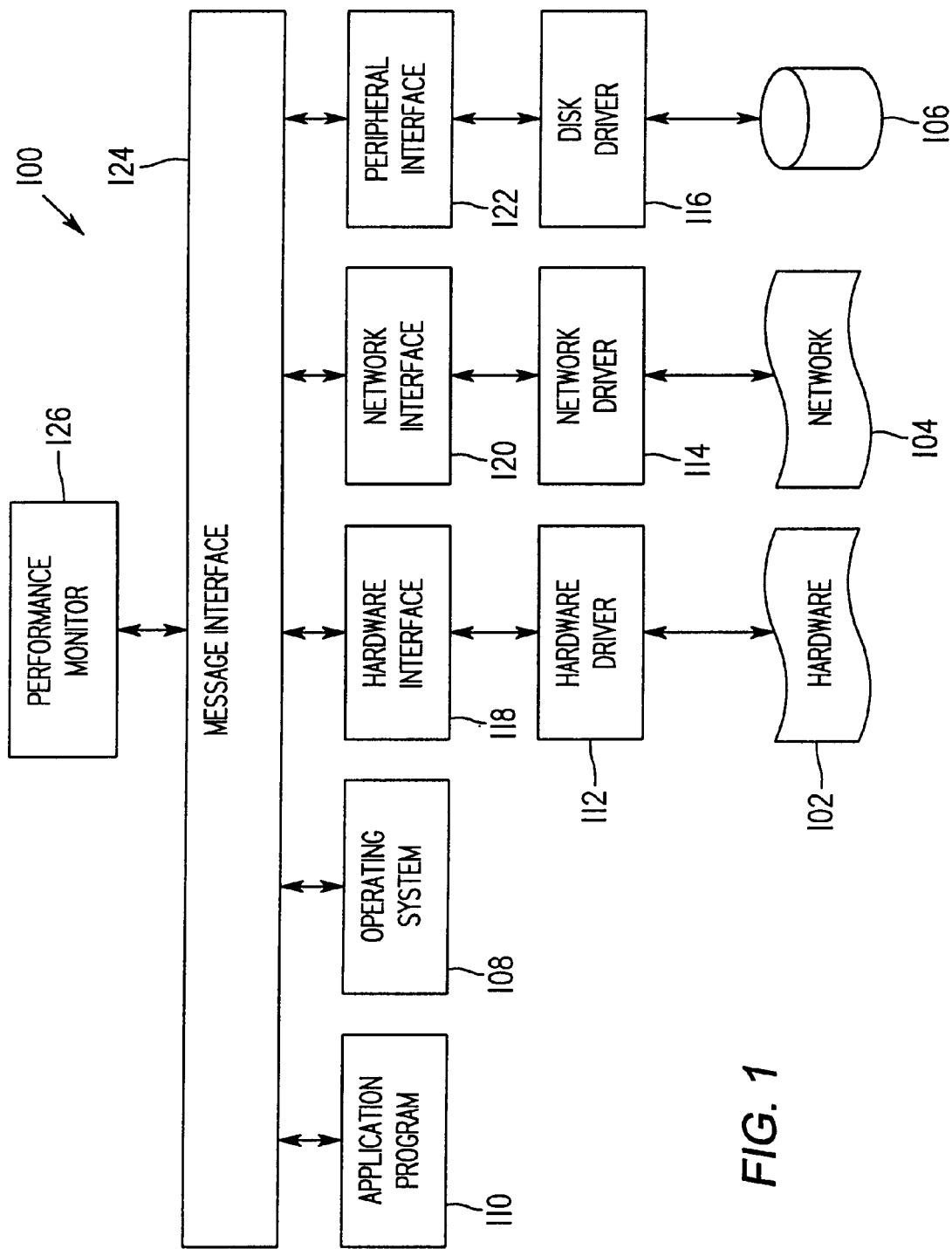
FIG. 1 is a block diagram of a computer system according to an embodiment of the invention.

FIG. 1 is a block diagram of a computer system 100 according to an embodiment of the invention. The computer system 100 provides performance monitoring capabilities that are useful in improving the overall performance of the computer system 100. The computer system 100 is particularly useful for obtaining run-time data for components associated with the computer system 100. In general, the components of the computer system 100 include both hardware and software resources of the computer system 100.

The computer system 100 includes hardware 102, a network 104, and a storage device 106. The hardware 102, the network 104 and the storage device 106 are all hardware resources of the computer system 100. However, it should be noted that the network 104 is generally shared by a number of computer systems.

In addition, the computer system 100 includes an operating system 108 and an application program 110. The operating system 108 and the application program 110 are software resources of the computer system 100. The application program 110 is, for example, an application program that is executed by the computer system 100 in accordance with the operating system 108. In FIG. 1, the operating system 108 is, for example, NetWare operating system by Novell, Inc.

Drivers are provided within the computer system 100 to interact with hardware resources. In FIG. 1, the hardware 102 is associated with a hardware driver 112, the network 104 is associated with a network driver 114, and the storage device 106 is associated with a disk driver 116. As is the case for most operating systems, the operating system 108 is normally able to communicate with the drivers 112, 114 and 116. In the computer system 100, the drivers 112, 114 and 116 each have an interface that facilitates access to the drivers 112, 114 and 116. In particular, a hardware interface 118 is associated with the hardware driver 112, a network interface 120 is associated with the network driver 114, and a peripheral interface 122 is associated with the disk driver 16.

The computer system 100 includes a message interface 124 that provides a path over which messages can travel from/to the drivers 112, 114 and 116 (via the interfaces 118, 120 and 122), the operating system 108, or the application 110 and to/from a performance monitor 126. The performance monitor 126 is used to monitor certain aspects of the performance of the computer system 100. In monitoring the performance of the hardware resources of the computer system 100, the performance monitor 126 interacts with the components of the computer system 100 via the message interface 124. In particular, the performance monitor 126 interacts with the drivers 112, 114 and/or 116 so as to closely monitor the operation of the hardware 102, the network 104 and/or the data storage 106. In monitoring the performance of the software resources of the computer system 100, the performance monitor 126 interacts with the operating system 108 and/or the application program 10 to monitor their operation. Although no drivers are utilized, the interface between the message interface 124 and the operating system 108 and the application program 110 can be handled by a programming interface. By being able to closely monitor the operation of the hardware and software resources of the computer system 100, the performance monitor 126 is able to receive and process real-time data.

In general, the drivers 112, 114 and 116 as well as the programming interfaces are considered interface mechanisms. The interface mechanisms facilitate access to the behavioral data that the performance monitors are interested in monitoring.

The real-time data can include a variety of different items. For example, the real-time data can include data on frequency of events, processor usage, memory usage, bus usage, threshold checks, performance statistics, and the like. In a multiprocessing computer system, the data can span several processes. The data can also span several computer systems using either the network 104 or another network that is coupled to the message interface 124. The real-time data can be used by the performance monitor 126, or some other operating device or process that utilizes the real-time data, to perform, for example, software tuning, load balancing, driver tuning and/or failure prediction. Additionally, the real-time data can be used to determine needed system improvements (e.g., additional memory, newer software version, etc.).

The performance monitor 126 is generally a program which can be an independent program or embedded in another program (e.g., process), but could also be provided in hardware (e.g., an ASIC). The computer system 100 can include one or more performance monitors, each of which monitor the performance of different events or data supplied by the drivers that are active on the computer system 100.

Traditionally, the drivers that are active on the computer system 100 are not fixed and either arrive or depart in accordance with a user's hot-plugging or unplugging of the associated hardware device. The same effect occurs when the driver or the associated hardware device itself fails. For software resources, the programs or processes are active on the computer system 100 when they are executing.

Figure 2:
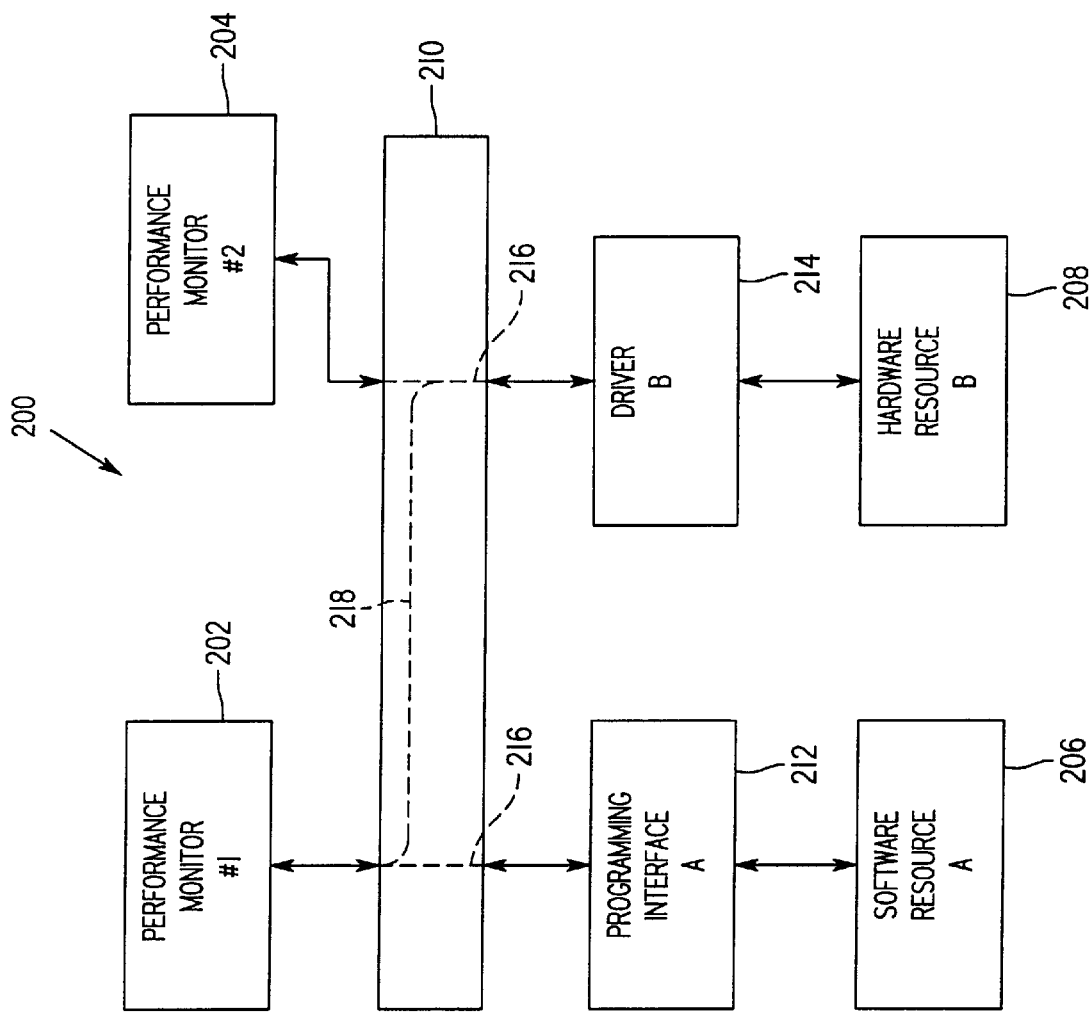
FIG. 2 is a block diagram of a computer system according to an embodiment of the invention.

FIG. 2 is a block diagram of a computer system 200 according to an embodiment of the invention. The computer system 200 includes a first performance monitor (#1) 202 and a second performance monitor (#2) 204. The first performance monitor (#1) 202 and the second performance monitor (#2) 204 are programs or processes that monitor performance of certain hardware and software resources of the computer system 200. For example, the performance monitors 202 and 204 can be dedicated performance monitoring and analysis application programs or specialized processes within application programs not dedicated to performance monitoring.

In the embodiment of the invention illustrated in FIG. 2, the first performance monitor (#1) 202 is activated to monitor a software resource A 206 and a hardware resource B 208. Also, the second performance monitor (#2) 204 is activated to monitor the hardware resource B 208. More particularly, the first performance monitor (#1) 202 couples to a message interface 210 and in turn couples to both the hardware resource A 206 via a programming interface A 212 and the hardware resource B 208 via the driver B 214. The second performance monitor (#2) 204 also couples to the message interface 210 and in turn couples to the hardware resource B 208 via the driver B 214. Dashed lines 216, 218 and 220 illustrated in FIG. 2 indicate the paths through which the data or events from the drivers 212 and 214 are supplied to the performance monitors 202 and 204. Specifically, the dashed line 216 represents the path of data, events and commands to and from the first performance monitor (#1) 202 and the programming interface A 212. The dashed line 218 represents the path of data, events and commands to and from the first performance monitor (#1) 202 and the driver B 214. The dashed line 220 represents the path of data, events and commands to and from the second performance monitor (#2) 204 and the driver B 214. In general, however, it should be recognized that the message interface 210 enables the performance monitor to communicate with any hardware or software resource.

Figure 3:
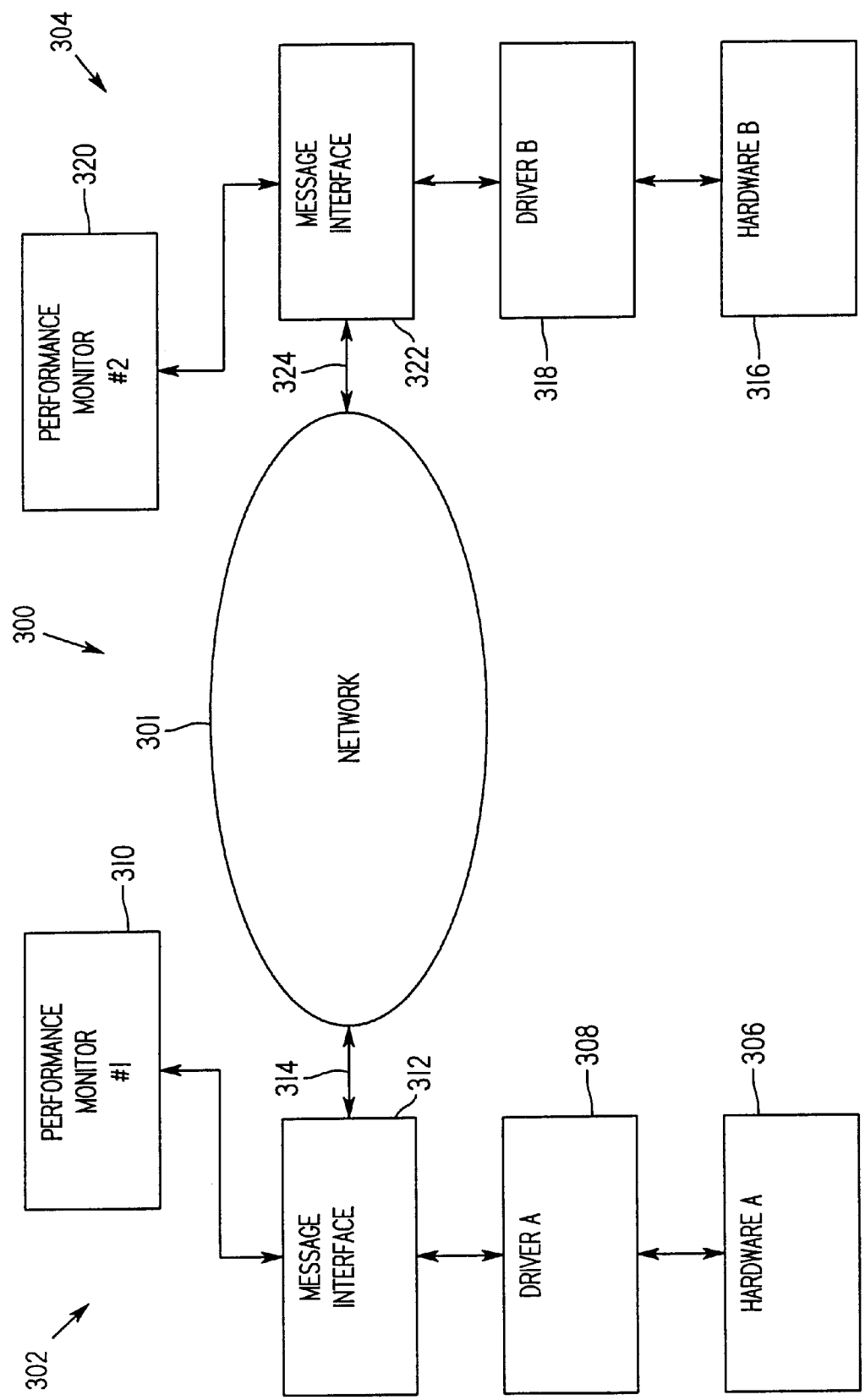
FIG. 3 is a block diagram of a performance monitoring system across a network according to another embodiment of the invention.

FIG. 3 is a block diagram of a performance monitoring system 300 across a network 301 according to another embodiment of the invention. In this embodiment, the performance monitoring network 300 includes a first computer system 302 and a second computer system 304. According to this embodiment, in addition to monitoring its own hardware, the hardware at the first computer system 302 can be monitored by a performance monitor at the second computer system 304 and the hardware at the second computer system 304 can be monitored by a performance monitor at the first computer system 302. Accordingly, the invention is able to monitor the performance of components located not only on the particular computer system on which the performance monitor resides but also on any other computer system that is coupled to the particular computer system via a network.

The first computer system 302 includes hardware A 306 and a driver A 308 for interacting with the hardware A 306. A message interface 312 couples to the driver A 308 and a first performance monitor (#1) 310. The message interface 312 is also coupled to the network 301 through a link 314. Hence, the message interface 312 can forward messages to and from the driver A 308 from and to the performance monitor (#1) 310 as well as the network 301. The computer system 304 includes hardware B 316 and a driver B 318 for interacting with the hardware B 316. A message interface 322 couples to the driver B 318 and a second performance monitor (#2) 320. The message interface 322 is also couples to the network 301 over a link 324. Hence, the message interface 322 can forward messages to and from the driver B 318 from and to the performance monitor (#2) 320 as well as the network 301. Messages forwarded by the message interfaces 312 and 322 can also be transmitted through the network 301 to the other of the message interfaces 322 and 312. Accordingly, since the message interfaces 312 and 322 are coupled together through the network 301, the first performance monitor (#1) 310 is able to monitor the hardware B 316 and the second performance (#2) 320 is able to monitor the hardware A 306.

Regardless of the embodiment of the invention, the various components of the computer system is able to interact with the one or more performance monitors. However, even if no performance monitors are present, the computer system with its various components operates properly. That is, the computer system is tolerant of the presence or absence of performance monitors. In general, the interface mechanisms (e.g., drivers and programming interfaces) inform one or more performance monitors of events or data, and the one or more performance monitors track and store the events or data from the interface mechanisms. The one or more performance monitors can also send commands to the interface mechanisms when requesting specific actions by the interface mechanisms or components.

Also, with the invention, the message interfaces 124, 210, 312 and 322 pass messages to/from the performance monitors from/to the components via the interface mechanisms. The message interfaces 124, 210, 312 and 322 can provide communications (messages) between the performance monitors and the interface mechanisms to the components by using inter-process communication, via a hardware bus, or over a network. The messages contain behavioral data or commands. The messages containing behavioral data from the components and/or the interface mechanisms can be time stamped. By time stamping the events within the behavioral data, the timing between events can be determined by the performance monitors. The time stamping can be performed by the components, the interface mechanisms, the message interface or the performance monitor.

The performance monitors 126, 202, 204, 310 and 320 can be application programs that operates, for example, to provide storage for the data events, interpretation of the data, and display of the results for the data itself. In furtherance of the display of data, the performance monitor typically includes a graphical user interface to display the data in a graphical and meaningful way for user. The user, for example, can be a system administrator or a network administrator.

Figure 4A:
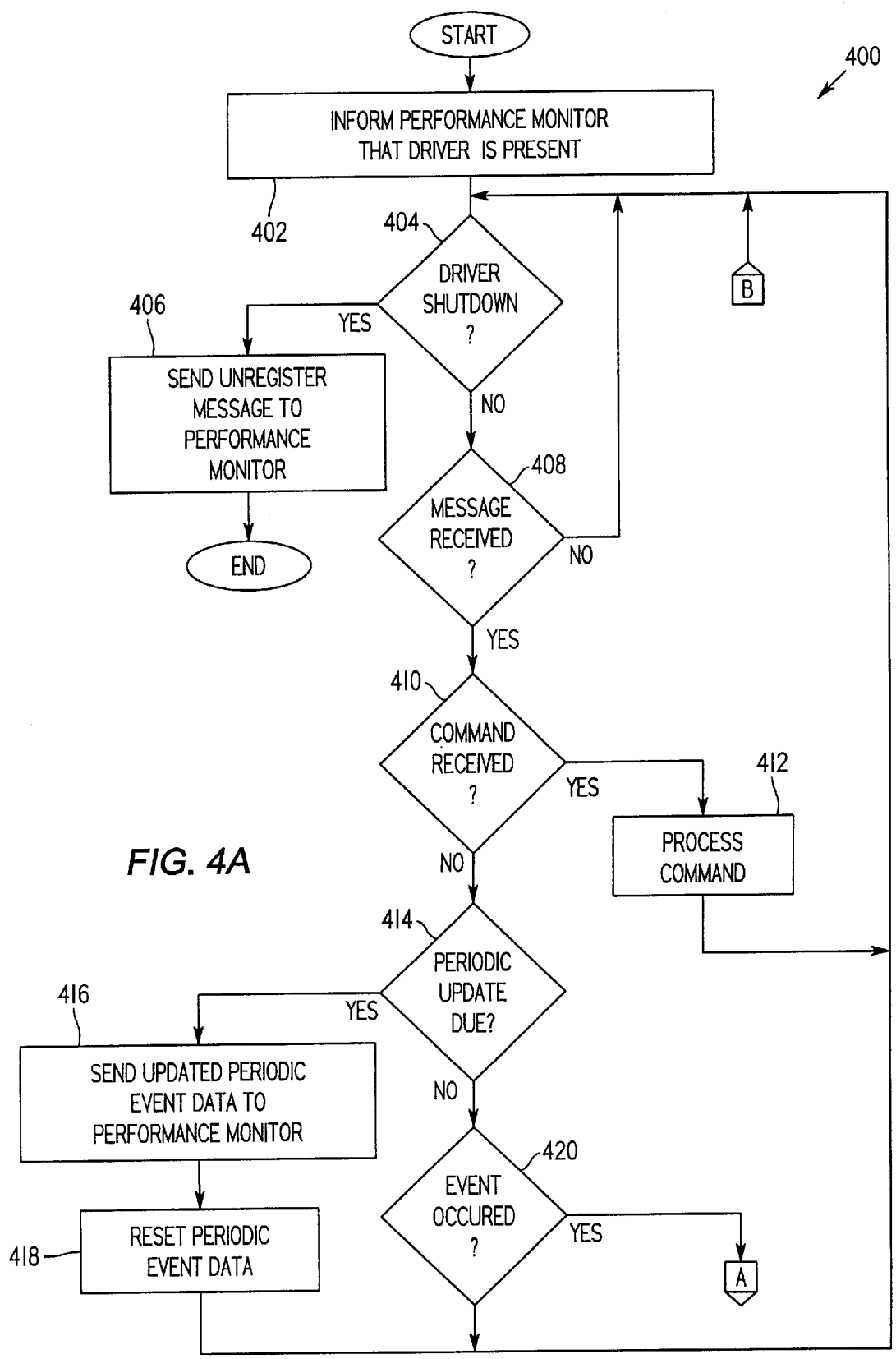
FIGS. 4A and 4B are flow diagrams illustrating driver processing according to an embodiment of the invention.
Figure 4B:
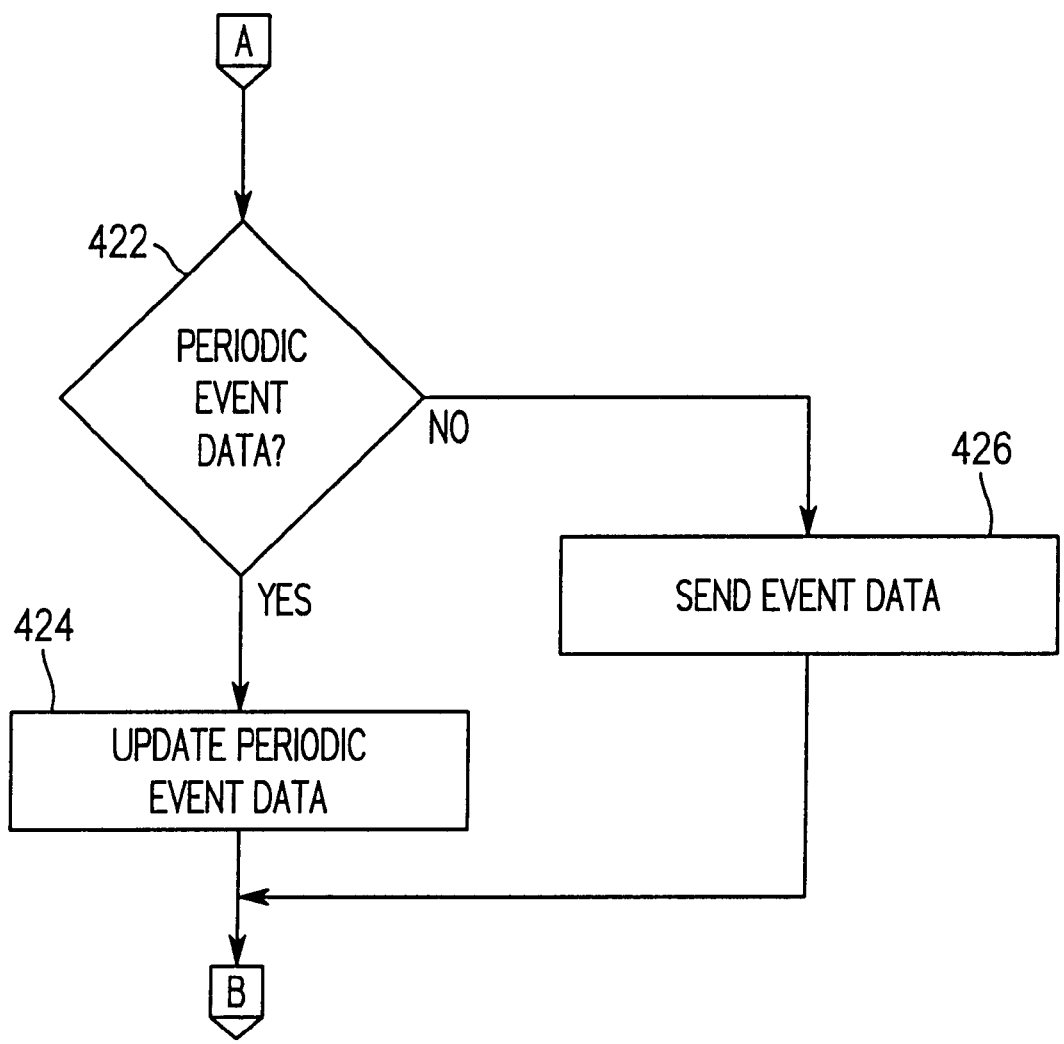

FIGS. 4A and 4B are flow diagrams illustrating driver processing 400 according to an embodiment of the invention. The driver processing 400 is the processing performed by a driver when interacting with a performance monitor to provide performance monitoring of the hardware resource associated with the driver. The driver processing 400 is, for example, the processing performed by the driver 214 illustrated in FIG. 2. Additionally, the driver processing 400 could also be the processing performed by the hardware driver 112, the network driver 114 and/or the disk driver 116. In any case, it should be understood that the driver processing 400 illustrated in FIGS. 4A and 4B represents only that portion of the operation of the drivers that is associated with performance monitoring, and thus other functions or operations conventionally performed by drivers are not illustrated.

Initially, the driver processing 400 informs 402 a performance monitor that a driver is present. Typically, the performance monitor will be informed that a particular driver is present when the driver is activated. As an example, when a hardware resource (e.g., PCMCIA card, peripheral device, network card) is connected to a computer system, a driver associated with that hardware resource is normally automatically activated. Once the driver is activated, the driver operates to notify or inform 402 the performance monitor that the driver is newly present. In one embodiment, the activation of a driver triggers the sending of a registration request message to a performance monitor. The performance monitor operates to register the driver. Of course, the driver could inform 402 more than one performance monitor of its presence.

Next, a decision block 404 determines whether the driver has been shut down. If the decision block 404 determines that the driver has been shut down, an unregister message is sent 406 to the performance monitor. The unregister message informs the performance monitor that the driver is no longer active and that its prior registration with the performance monitor should be removed. As an example, the driver is shut down when the hardware resource associated with the driver is powered-off, fails or otherwise disconnected from the computer system. Following block 406, the driver processing 400 is complete and ends.

On the other hand, when the decision block 404 determines that the driver has not been shut down, the driver processing 400 operates to pass messages to and from the performance monitor. The messages, for example, can include commands, data or events. The driver processing 400 continues with a decision block 408 that determines whether a message has been received from the performance monitor. If no message has been received, the decision block 408 causes the driver processing 400 to return to repeat block 404 and subsequent blocks. However, once the decision block 408 determines that a message has been received from the performance monitor, then a decision block 410 determines whether a command has been received from the performance monitor. If the message that has been received from the performance monitor includes a command, then following the decision block 410, the command is processed 412. Following the processing 412 of the command, the driver processing 400 returns to repeat block 404 and subsequent blocks.

Alternatively, when the decision block 410 determines that the message that has been received does not include a command, then a decision block 414 determines whether a periodic update is due. Here, the message received does not include a command, but instead includes event data. Hence, the driver processing 400 operates to determine whether a periodic update is due. When the decision block 414 determines that a periodic update is due, then updated periodic event data is sent 416 to the performance monitor. Next, the periodic event data is reset 418. Accordingly, periodic event data is only periodically sent to a performance monitor. Following block 418, the driver processing 400 returns to repeat the decision block 404 and subsequent blocks.

When the decision block 414 determines that the periodic update is not yet due, a decision block 420 determines whether an event has occurred. The events are either a periodic event or a data event. An event is a non-periodic event signaled by the driver. If the decision block 420 determines that an event has not occurred, then the processing returns to repeat the decision block 404 and subsequent blocks. On the other hand, when the decision block 420 determines that an event has occurred, then a decision block 422 determines whether the event is a periodic event or a data event. When the event is determined to be a periodic event, the periodic event is updated 424. On the other hand, when the decision block 422 determines that the event is not a periodic event, then the event is a data event and is sent 426 to the performance monitor. Following blocks 424 and 426, the driver processing 400 returns to repeat the decision block 404 and subsequent blocks.

Although FIGS. 4A and 4B pertain to the acquisition of behavioral data associated with hardware resources, similar operations would be provided by programming interfaces for software resources. Also, as will become more apparent below, given the preferred modular design of the drivers and performance monitors, the driver processing can still operate without interacting with any performance monitors being present. Hence, the lack of active performance monitors on a computer system having interface mechanisms will not disturb the operation of the computer system. Likewise, performance monitoring processing can operate without the computer system having any interface mechanisms to interact with.

Figure 5A:
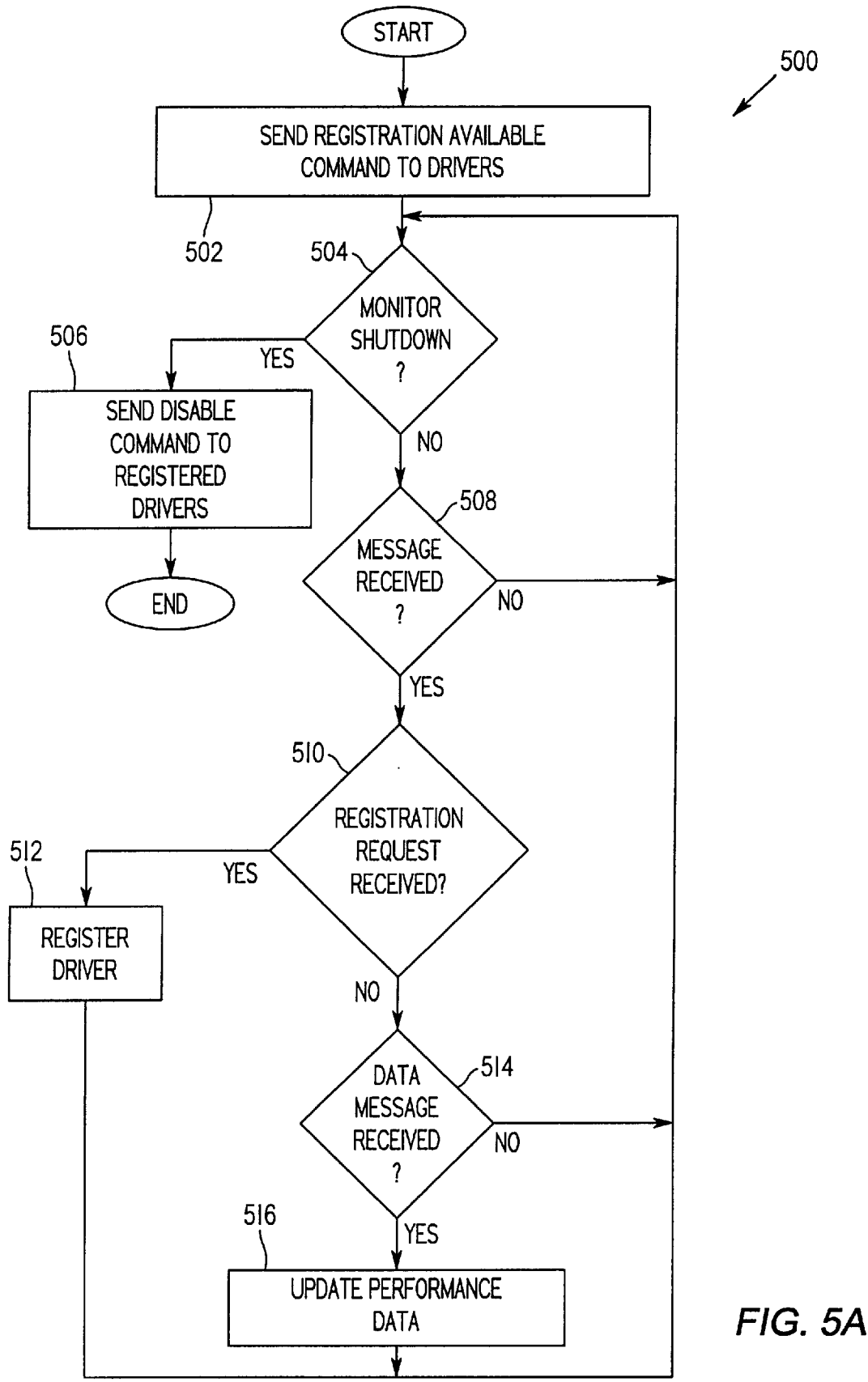
FIG. 5A is a flow diagram of performance monitoring processing according to an embodiment of the invention.

FIG. 5A is a flow diagram of performance monitoring processing 500 according to an embodiment of the invention. The performance monitoring processing 500 is performed by a performance monitor. The performance monitor, for example, is either of the performance monitors 202 and 204 of FIG. 2. Alternatively, the performance monitor could be the performance monitor 126 of the computer system 100 illustrated in FIG. 1.

The performance monitoring processing 500 initially sends 502 a registration available command to drivers (interface mechanisms). Here, once a performance monitor is activated, it sends 502 the registration available command to all of the drivers of the computer system to inform them that the performance monitor is active.

Next, a decision block 504 determines whether the performance monitor has been shut down. If the decision block 504 determines that the performance monitor has shut down, then a disable command is sent 506 to the registered drivers. The disable command notifies the registered drivers that the particular performance monitor has been shut down and that the driver no longer need send messages to that performance monitor. Following block 506, the performance monitoring processing 500 is complete and ends.

On the other hand, when the decision block 504 determines that the performance monitor has not been shut down, the performance monitoring processing 500 continues. In a decision block 508, the performance monitoring processing 500 determines whether a message has been received from a driver. When the decision block 508 determines that no message has been received, then the performance monitoring processing 500 returns to repeat the decision block 504 and subsequent blocks. Once the decision block 508 determines that a message has been received, then the message is processed by the performance monitoring processing 500. Specifically, a decision block 510 determines whether the message received is a registration request. When the decision block 510 determines that the message received is a registration request, the performance monitor processing 500 registers 512 the driver. The processing performed in registering a driver is described in detail below with reference to FIG. 5B.

On the other hand, when the decision block 510 determines that the message received is not a registration request, then a decision block 514 determines whether the message received is a data message. If the message received is determined to be a data message, then performance data is updated 516 for the particular driver. Following block 516, the performance monitoring processing 500 returns to repeat the decision block 504 and subsequent blocks. Also, when the decision block 514 determines that the message received is not a data message, then the performance monitoring processing 500 also returns to repeat the decision block 504 and subsequent blocks.

In general the data obtained and stored by the performance monitor can by use to monitor or improve the performance of the computer system. The data could also be use by the performance monitor to notify the computer system of certain conditions or exceeded thresholds, such as over-utilization of a resource or failure prediction. The performance monitor could also be use in tuning software performance, load balancing, detecting security attacks, or detecting actual hardware resource failures.

Figure 5B:
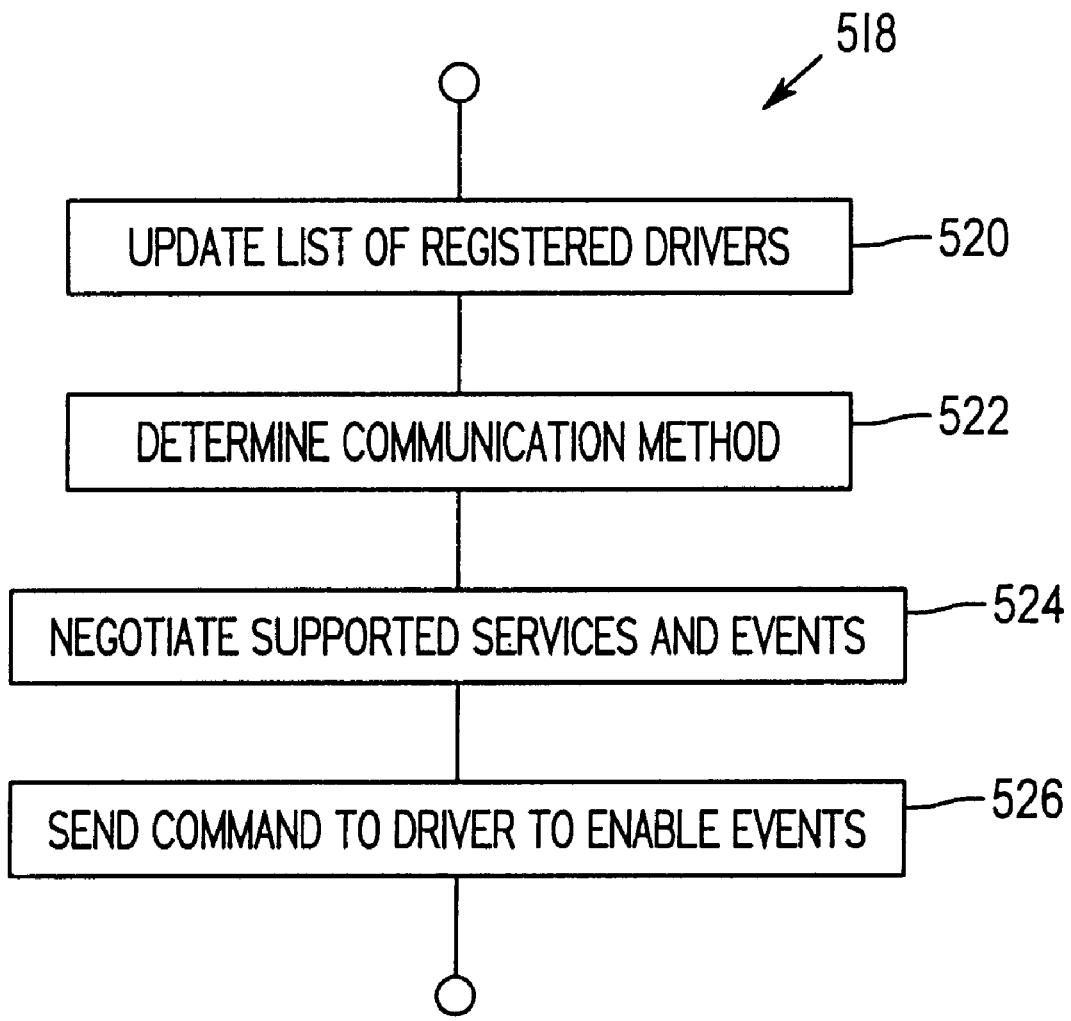
FIG. 5B is a flow diagram of driver registration processing performed by the performance monitor when registering a driver.

FIG. 5B is a flow diagram of driver registration processing 518 performed by the performance monitor when registering a driver. As an example, the driver registration processing 518 describes the processing performed by the driver registration block 512 of FIG. 5A. In FIG. 5B, the driver registration processing 518 initially updates 520 a list of registered drivers that is maintained by the performance monitor. Next, a communication method is determined 522. By the communication method, the performance monitor informs the driver of the communications it is interested in. As an example, the performance monitor may only desire periodic data from the driver or may require only immediate event data from the driver, or may require some of both. As another example, the performance monitor could inform the driver that it is interested in receiving only data regarding extreme usage conditions of the associated device.

Next, the driver and the performance monitor negotiate 524 for supported services and events. The negotiation 524 is important for future versions of the performance monitoring processing 500 so that the processing is backwards compatible to earlier versions. Hence, the services supported and the events transmitted between driver and performance monitor must be understood and agreed upon by both the driver and the performance monitor if the performance monitor is to utilize such events and provide such services. Then, a command is sent 526 to the driver seeking registration. to enable it to send the services and events desired by the performance monitor.

Representative events that may be monitored by a performance monitor according to the invention, include: disk read/write commands, disk read/write completions, network packets sent/received, and content switches.

Figure 6:
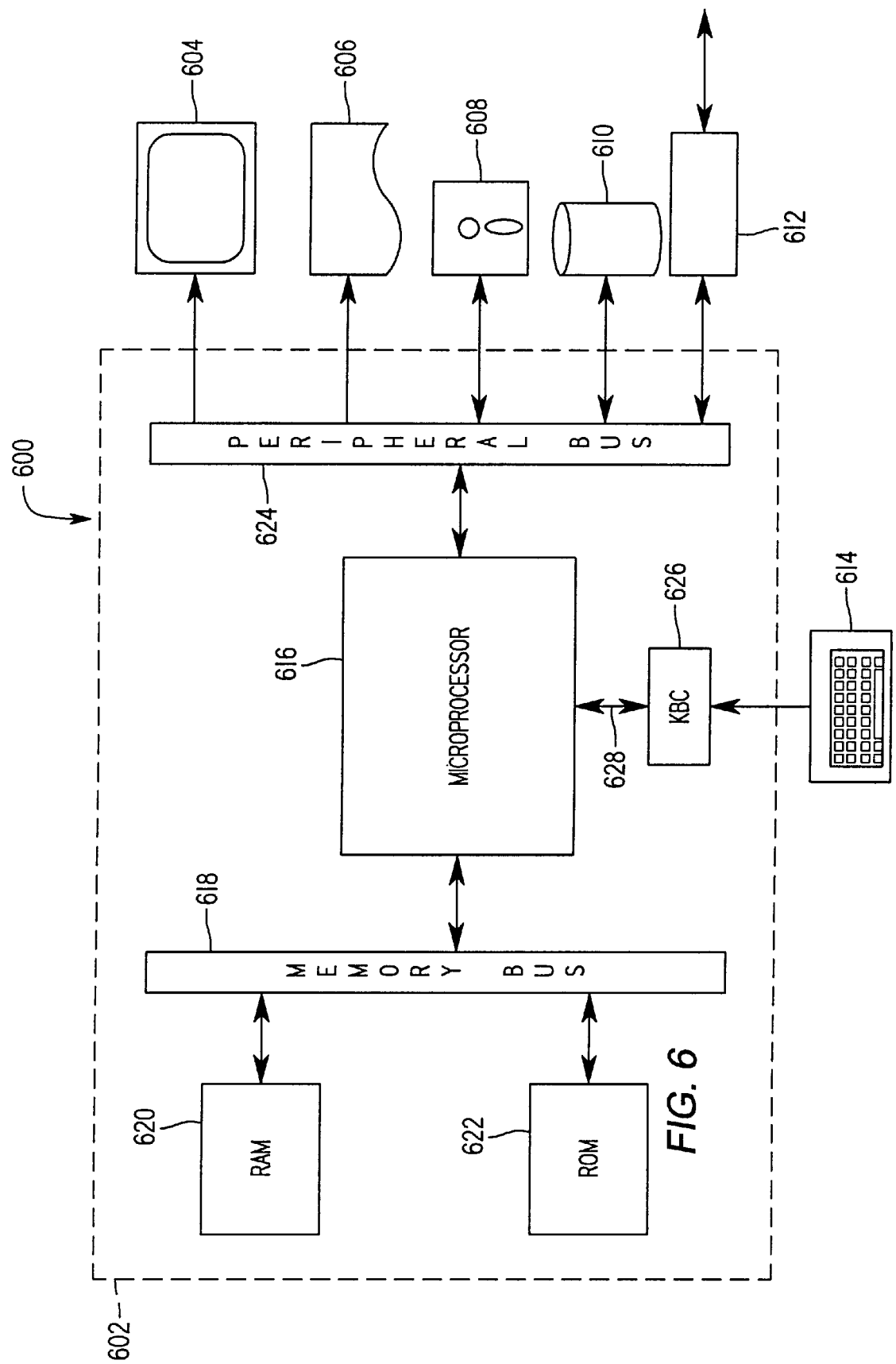
FIG. 6 is a block diagram of an exemplary computer system for carrying out the processing according to the invention.

FIG. 6 is a block diagram of an exemplary computer system 600 for carrying out the processing according to the invention. The portion of the computer system 100 illustrated in FIG. 1 is, for example, contained in the exemplary computer system 600.

The computer system 600 includes a digital computer 602, a display screen (or monitor) 604, a printer 606, a floppy disk drive 608, a hard disk drive 610, a network interface 612, and a keyboard 614. The digital computer 602 includes a microprocessor 616, a memory bus 618, random access memory (RAM) 620, read only memory (ROM) 622, a peripheral bus 624, and a keyboard controller 626. The digital computer 600 can be a personal computer (such as an IBM compatible personal computer), a workstation computer (such as a Sun Microsystems or Hewlett-Packard workstation), a mini-computer, a mainframe computer, or some other type of computer.

The microprocessor 616 is a general purpose digital processor which controls the operation of the computer system 600. The microprocessor 616 can be a single-chip processor or can be implemented with multiple components. Using instructions retrieved from memory, the microprocessor 616 controls the reception and manipulation of input data and the output and display of data on output devices. According to the invention, a particular function of microprocessor 616 is to perform the monitoring of the various components (e.g., hardware resources 604–612) of the computer system 600.

The memory bus 618 is used by the microprocessor 616 to access the RAM 620 and the ROM 622. The RAM 620 is used by the microprocessor 616 as a general storage area and as scratch-pad memory, and can also be used to store input data and processed data. The ROM 622 can be used to store instructions or program code followed by the microprocessor 616 as well as other data.

The peripheral bus 624 is used to access the input, output, and storage devices used by the digital computer 602. In the described embodiment, these devices include the display screen 604, the printer device 606, the floppy disk drive 608, the hard disk drive 610, and the network interface 612. The keyboard controller 626 is used to receive input from keyboard 614 and send decoded symbols for each pressed key to microprocessor 616 over bus 628.

The display screen 604 is an output device that displays images of data provided by the microprocessor 616 via the peripheral bus 624 or provided by other components in the computer system 600. The printer device 606 when operating as a printer provides an image on a sheet of paper or a similar surface. Other output devices such as a plotter, typesetter, etc. can be used in place of, or in addition to, the printer device 606.

The floppy disk drive 608 and the hard disk drive 610 can be used to store various types of data. The floppy disk drive 608 facilitates transporting such data to other computer systems, and hard disk drive 610 permits fast access to large amounts of stored data.

The microprocessor 616 together with an operating system operate to execute computer code and produce and use data. The computer code and data may reside on the RAM 620, the ROM 622, or the hard disk drive 620. The computer code and data could also reside on a removable program medium and loaded or installed onto the computer system 600 when needed. Removable program mediums include, for example, CD-ROM, PC-CARD, floppy disk and magnetic tape. The operating system preferably includes a software layer which interfaces between the hardware and higher layers of the operating system. When device drivers want to communicate with the hardware (e.g., display 604, printer 606, drives 608 and 610) they do so by function calls to the software layer.

The network interface 612 is used to send and receive data over a network connected to other computer systems. An interface card or similar device and appropriate software implemented by the microprocessor 616 can be used to connect the computer system 600 to an existing network and transfer data according to standard protocols.

The keyboard 614 is used by a user to input commands and other instructions to the computer system 600. Other types of user input devices can also be used in conjunction with the present invention. For example, pointing devices such as a computer mouse, a track ball, a stylus, or a tablet can be used to manipulate a pointer on a screen of a general-purpose computer.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices, and networks. In the case of networks, computer readable medium includes a wired or wireless link over which the computer readable code is transmitted with electrical signals. The computer readable code can also be distributed over network coupled computer systems so that the computer readable code is stored and executed in a distributed fashion.

As examples, a performance monitor could be an event-log gatherer that accumulates and stores a record of the system's behavior for later analysis and comparisons; or 2) an application which graphs the behavior of the computer system. Further, as examples, an interface mechanism could be: a Local Area Network (LAN) driver indicating throughput, packet rates, and interrupts; a disk driver indicating read requests, data transfer rates, and request ages; an operating system scheduler indicating processor utilization, task context, memory usage, and resource allocation; an acquisition interface indicating temperature, power, functionality, and failure events.

The advantages of the invention are numerous. One advantage of the invention is that the monitoring of components of a computer system is made flexible and reliable. The flexibility, for example, allows the components to be hardware or software resources. Another advantage of the invention is that the monitoring can be essentially real-time monitoring, while still being able to provide historical data. Yet another advantage of the invention is that different monitoring programs are able to both monitor the same hardware resource. Another advantage of the invention is that interface mechanisms need not be burdened with processing to interpret and display data.

Yet another advantage of the invention is the interface mechanism and performance monitor no longer need to be tightly coupled, but work independently of one another and are not harmed or negatively impacted by the removal or deactivation of any interface mechanism (e.g., driver) or performance monitor. The invention also works with hot pluggable devices. In other words, the performance monitor does not care whether the interface mechanism (e.g., driver) is present. Likewise, the interface mechanism does not care if there are one or more performance monitors interested in its data or event. The performance monitors automatically detects whether the interface mechanism is supported. When the performance monitor does support the interface mechanism, the interface mechanism in turn detects the performance monitor. As such, the components are able to come and go or be enabled (in any order) not only during operation (i.e., run-time) of a computer system but also while monitoring of the computer system is being performed, without causing system difficulties in either case.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system, comprising:

a processing unit for executing programs;

a plurality of hardware resources utilized by said processing unit;

a plurality of interface mechanisms to said hardware resources; and a performance monitoring program that interacts with said hardware resources using said interface mechanisms so as to monitor performance of said hardware resources, said performance monitoring program being executed by said processing unit, wherein said interface mechanisms are registered with said performance monitoring program so that said interface mechanisms know to send particular information on at least said hardware resources to said performance monitoring program.

2. A computer system as recited in claim 1, wherein said interface mechanisms are drivers.

3. A computer system as recited in claim 1, wherein said hardware resources produce event information, and wherein the event information is supplied to said interface mechanisms, and said interface mechanisms forward at least a portion of the event information to said performance monitoring program.

4. A computer system as recited in claim 3, wherein said performance monitoring program notifies said interface mechanisms of a portion of the event information desired, and wherein said interface mechanisms forward the portion of the event information desired to said program monitoring program without forwarding the remaining portion of the event information that is undesired.

5. A computer system as recited in claim 4, wherein said interface mechanisms are drivers.

6. A computer system as recited in claim 5, wherein said computer system further comprises an operating system, and wherein said operating system interacts with said hardware resources through said drivers.

7. A computer system as recited in claim 4, wherein said computer system is coupled to a network, and wherein said performance monitoring program is located and operated on another computer system that is also coupled to the network.

8. A computer system as recited in claim 1, wherein said computer system further comprises a display device, wherein said performance monitoring program receives the particular information sent by said interface mechanisms, generates analysis data and images from the information provided by said interface mechanisms, and displays the analysis data and images produced by said performance monitoring program.

9. A computer system as recited in claim 8, wherein said performance monitoring program provides essentially real-time monitoring of the hardware resources associated with said interface mechanisms.

10. A computer system as recited in claim 9, wherein said interface mechanisms forward event information to said performance monitoring program, and said performance monitoring program utilizes the event information to monitor the performance of the hardware resources.

11. A computer system as recited in claim 10, wherein the event information includes at least periodic events and immediate events.

12. A method for monitoring hardware resources of a computer system, the computer system including drivers for interacting with the hardware resources, said method comprising:

registering drivers that are active with a performance monitoring program, the drivers having event information for the respective hardware resources;

informing the registered drivers of event information that the performance monitoring program is interested in receiving from the registered drivers;

selectively forwarding event information from the registered drivers to the performance monitoring program to the extent interested; and receiving the event information at the performance monitoring program; and maintaining, at the performance monitoring program, performance information on the hardware resources associated with the registered drivers in accordance with the event information received.

13. A method as recited in claim 12, wherein said maintaining operates to provide essentially real-time monitoring of the hardware resources associated with the registered drivers.

14. A method as recited in claim 12, wherein the event information is produced by the registered drivers, and the event information includes at least periodic events and immediate events.

15. A method as recited in claim 14, wherein said forwarding of the event information from the registered drivers to the performance monitoring program comprises the operations of:

determining whether a periodic event or an immediate event has occurred;

when the periodic event has occurred,
updating periodic event information,
determining whether a periodic update is due, and
forwarding the periodic event information to the performance monitoring program when the periodic update is determined to be due; and when the immediate event has occurred, updating immediate event information.

16. A method as recited in claim 12, wherein said method further comprises:

unregistering drivers from the performance monitoring program when the drivers become inactive.

17. A method as recited in claim 12, wherein the performance monitoring program sends commands to the registered drivers to control operations performed by the drivers.

18. A method as recited in claim 12, wherein said method further comprises:

displaying graphic representations of the performance information.

19. A method as recited in claim 18, wherein the performance information can include or provide data to determine rates, averages and totals.

20. A computer readable medium containing program instructions for monitoring components of a computer system, the computer system including interface mechanisms for interacting with the components, said computer readable medium comprising:

first computer readable code for registering interface mechanisms that are active with a behavioral monitoring program, the interface mechanisms having behavioral information for the respective components;

second computer readable code for informing the registered interface mechanisms of behavioral information that the behavioral monitoring program is interested in receiving from the registered interface mechanisms;

third computer readable code for selectively forwarding behavioral information from the registered interface mechanisms to the behavioral monitoring program to the extent interested;

fourth computer readable code for receiving the behavioral information at the behavioral monitoring program; and fifth computer readable code for maintaining, at the behavioral monitoring program, performance information on the components associated with the registered interface mechanisms in accordance with the behavioral information received.

21. A computer readable medium as recited in claim 20, wherein the interface mechanisms are drivers, the behavioral information includes events, and the components are hardware resources.

22. A computer readable medium as recited in claim 20, wherein the behavioral data is produced by the components and includes at least one of events, rates, totals, averages and states, and the components of the computer system include at least one of drivers, hardware resources, application programs and operating system programs.

23. A computer readable medium as recited in claim 20, wherein said behavioral monitoring program notifies said interface mechanisms of a portion of the behavioral information desired, and wherein said interface mechanisms forward the portion of the behavioral information desired to said program monitoring program without forwarding the remaining portion of the behavioral information that is undesired.

24. A computer readable medium as recited in claim 23, wherein the behavioral information being monitored pertains to at least one of performance, security and health of the components of the computer system.

25. A computer readable medium as recited in claim 20, wherein the behavioral information being monitored pertains to at least one of performance, security and health of the components of the computer system.

26. A computer readable medium as recited in claim 20, wherein said computer system is coupled to a network, and wherein said behavioral monitoring program is located and operated on another computer system that is also coupled to the network.

27. A computer readable medium as recited in claim 20, wherein said computer system further comprises a display device, wherein said behavioral monitoring program receives the particular information sent by said interface mechanisms, generates analysis data and images from the information provided by said interface mechanisms, and displays the analysis data and images produced by said behavioral monitoring program.

28. A computer readable medium as recited in claim 20, wherein said behavioral monitoring program provides essentially real-time monitoring of the hardware resources associated with said interface mechanisms.

29. A computer system, comprising:

a processing unit for executing programs;

a plurality of hardware resources utilized by said processing unit;

a plurality of interface mechanisms to said hardware resources; and a behavioral monitoring program that interacts with said hardware resources using said interface mechanisms so as to monitor behavior of said hardware resources, said behavioral monitoring program being executed by said processing unit, wherein said interface mechanisms are registered with said behavioral monitoring program so that said interface mechanisms know to send particular information on at least said hardware resources to said behavioral monitoring program.

30. A computer system as recited in claim 29, wherein the programs executed by said processing unit include system software resources, wherein said interface mechanisms are provided to said hardware resources and to said system software resources, and wherein said behavioral monitoring program that interacts with said hardware resources and said system software resources using said interface mechanisms so as to monitor behavior of said hardware resources and said system software resources.

31. A computer system as recited in claim 30, wherein said hardware resources produce event information, and wherein the event information is supplied to said interface mechanisms, and said interface mechanisms forward at least a portion of the event information to said behavioral monitoring program.

32. A computer system as recited in claim 31, wherein said behavioral monitoring program notifies said interface mechanisms of a portion of the event information desired, and wherein said interface mechanisms forward the portion of the event information desired to said program monitoring program without forwarding the remaining portion of the event information that is undesired.

* * * * *